United States Patent [19]
Patel et al.

[11] Patent Number: 5,145,696
[45] Date of Patent: Sep. 8, 1992

[54] CHEWING GUM WITH GUM BASE IN ROLLING COMPOUND

[75] Inventors: Mansukh M. Patel, Downers Grove; Edward S. Dubina, Evergreen Park, both of Ill.

[73] Assignee: Wm. Wrigley Jr. Company, Chicago, Ill.

[21] Appl. No.: 702,172

[22] Filed: May 15, 1991

[51] Int. Cl.$^5$ .............................................. A23G 3/30
[52] U.S. Cl. ........................................ 426/5; 426/103; 426/289
[58] Field of Search ........................................ 426/3-6, 426/96, 98, 103, 289

[56] References Cited

U.S. PATENT DOCUMENTS

| | | | |
|---|---|---|---|
| 3,262,784 | 7/1966 | Bucher | 426/3 |
| 4,370,350 | 1/1983 | Fisher et al. | 426/5 |
| 4,374,858 | 2/1983 | Glass et al. | 426/5 |
| 4,562,076 | 12/1985 | Arnold et al. | 426/5 |
| 4,737,366 | 4/1988 | Gergely et al. | 426/5 |
| 4,741,905 | 5/1988 | Huzinec | 426/5 |
| 4,753,805 | 6/1988 | Cherukuri et al. | 426/5 |
| 4,822,621 | 4/1989 | Glass et al. | 426/5 |
| 4,822,622 | 4/1989 | Dokuzovic et al. | 426/5 |
| 4,889,728 | 12/1989 | Maeda et al. | 426/5 |

FOREIGN PATENT DOCUMENTS

| | | |
|---|---|---|
| 0151344 | 8/1985 | European Pat. Off. . |
| 0160607 | 11/1985 | European Pat. Off. . |
| 0221850 | 5/1987 | European Pat. Off. . |
| 73-49962 | 7/1973 | Japan . |
| 1456474 | 11/1976 | Japan . |
| 88-14622 | 1/1988 | Japan . |
| 89-10946 | 1/1989 | Japan . |
| 86-03967 | 7/1986 | PCT Int'l Appl. . |
| 89-07895 | 9/1989 | PCT Int'l Appl. . |

OTHER PUBLICATIONS

Hixon et al., "Sizing Materials by Crushing and Grinding", *Chemical Engineering*, Nov. 1990, pp. 94-103.

*Primary Examiner*—Jeanette Hunter
*Attorney, Agent, or Firm*—Willian Brinks Olds Hofer Gilson & Lione

[57] ABSTRACT

A chewing gum having a rolling compound comprising gum base, flavoring, and sweetener. The chewing gum preferably comprises between about 0.5 to 10 percent by weight rolling compound. The rolling compound preferably comprises between about 20 to 90 percent by weight gum base, 1 to 15 percent by weight flavoring and 5 to 75 percent by weight sweetener. The rolling compound preferably has a particle size between about 75 and 850 microns. A method for manufacturing the gum is also disclosed.

13 Claims, No Drawings

CHEWING GUM WITH GUM BASE IN ROLLING COMPOUND

FIELD OF THE INVENTION

The present invention relates to chewing gum rolling compounds comprising gum base, sweetener and flavoring.

BACKGROUND OF THE INVENTION

Chewing gum may be dusted with materials such as powdered sugar to improve appearance and initial taste. Dusting also prevents the chewing gum from sticking to the fingers when handled, or to the wrapper when the product is unwrapped. The material used to dust chewing gum is known as a dusting compound or a rolling compound, because it also makes gum more manageable during the rolling and sheeting process.

Conventional known rolling compounds include sugars such as sucrose, alditols such as mannitol and sorbitol, starch, calcium carbonate and talc. This invention employs a new rolling compound comprising gum base, sweetener, and flavoring.

The manufacture of ground gum product is disclosed in U.K. Patent No. 1,456,474 and European Patent Application No. 0,221,850. The grinding or pulverizing of gum formulations for use in tablets is disclosed in European Patent Application No. 0,151,344, PCT Publication No. 86/003967, U.S. Pat. Nos. 3,262,784, 4,370,350, 4,737,366, 4,741,905, and 4,753,805. Patents which disclose the use of sweeteners in rolling compounds include U.S. Pat. No. 4,562,076, U.S. Pat. No. 4,373,858, PCT Publication No.89 007895, JAP 73-049962 and European Patent Application No. 0,160,607. The use of two gum formulations attached to each other for aspartame stability is disclosed in U.S. Pat. Nos. 4,822,621 and 4,822,622.

SUMMARY OF THE INVENTION

According to one aspect of the present invention, a chewing gum containing a rolling compound comprising gum base, sweetener and flavoring is provided. One advantage of the gum is an improved flavor impact and extended flavor duration.

In another aspect, the present invention provides a method of manufacturing a chewing gum composition. The method comprises mixing gum base, sweetener, and flavoring to obtain a rolling compound mixture and adding the rolling compound mixture to a preformed gum matrix. The gum matrix comprises chewable gum base, sweetener, and flavoring.

DETAILED DESCRIPTION OF THE PRESENTLY PREFERRED EMBODIMENTS

The present invention contemplates in one embodiment the use of an inventive rolling compound which comprises gum base, sweetener, and flavoring to significantly improve flavor impact and extend flavor duration. Preferably, an anti-sticking agent is also included in the inventive rolling compound.

The rolling compound preferably has a particle size that is greater than 90% between 20 mesh and 200 mesh or 75 to 850 microns. The rolling compound can have a larger particle size than conventional rolling compounds which are generally 95% through 80 mesh, or smaller than 180 microns. Conventional rolling compounds like sugar or mannitol need a smaller particle size to eliminate a gritty mouthful. This grittiness is due to the crystalline nature of these rolling compounds. In contrast, the inventive rolling compound has soft particles and does not need to be ground as fine to give a smooth mouthful.

Grinding the inventive rolling compound is the preferred way to achieve the desired particle size. Grinding the rolling compound may be accomplished by using a wide variety of crushing and grinding equipment. The inventive rolling compound is preferably ground using a hammer mill under a Nitrogen blanket to keep the air and product below freezing. Grinding may be done cryogenically with flow agents added to prevent sticking. However, any method of grinding the inventive rolling compound is contemplated by this invention.

Any gum base may be used in the inventive rolling compound. The gum base in the inventive rolling compound generally comprises elastomers, resins, fats and oils, waxes, softeners and inorganic fillers. Elastomers used may include polyisobutylene, isobutylene-isoprene copolymer, styrene butadiene rubber and natural latexes such as chicle. Resins include polyvinylacetate and terpene resins. Fats and oils may also be included in the gum base, including tallow, hydrogenated and partially hydrogenated vegetable oils and cocoa butter. Commonly employed waxes include paraffin, microcrystalline and natural waxes such as beeswax and carnauba. The gum base may also contain inert fillers such as calcium carbonate, talc, and calcium phosphate. If the gum base does not contain a filler it will be able to absorb and hold more flavor than a gum base with filler. The gum base may constitute between about 20 to 90 and more preferably between about 50 to 80 percent by weight of the inventive rolling compound.

The flavoring in the inventive rolling compound may comprise essential oils, synthetic flavors, or mixtures thereof including but not limited to oils derived from plants and fruits such as citrus oils, fruit essences, peppermint oil, spearmint oil, clove oil, oil of wintergreen, anise and the like. Artificial flavoring components are also contemplated. Those skilled in the art will recognize that natural and artificial agents may be in any sensorially acceptable blend. All such flavors and flavor blends are contemplated by the present invention. The flavoring agent may constitute between about 1 to 15 and more preferably between about 2 to 8 percent by weight of the inventive rolling compound.

The sweetener employed in the inventive rolling compound may be either a sugar sweetener or a sugarless sweetener. Sugar sweeteners contemplated by this invention include sucrose, dextrose, lactose and the like, alone or in any combination. Any known sugar sweetener can be used in this invention. Sugarless sweeteners contemplated by this invention include sugar alcohols such as sorbitol, mannitol, xylitol, and the like, alone or in any combination. Any known sugarless sweetener can be used in this invention. The sweetener constitutes between about 5 to 75 and more preferably between about 10 to 50 percent by weight of the inventive rolling compound.

An anti-sticking agent or flow agent can also be used in the inventive rolling compound. The level of anti-sticking agent employed can be about 0.5 to 5.0 percent by weight of the rolling compound depending on the type of agent used. Any conventional anti-sticking agent is contemplated by this invention including starch, talc, magnesium stearate, and silica. Silica is the preferred anti-sticking agent.

The inventive rolling compound may be mixed with conventional rolling compound at a level of 10–50% inventive rolling compound to 50–90% conventional rolling compound. Conventional rolling compounds, as discussed above, include sugars such as sucrose, alditols such as sorbitol and mannitol, starch, calcium carbonate, and talc. These conventional rolling compounds are less expensive and easier to produce. Therefore, mixing the inventive rolling compound with conventional rolling compounds decreases the cost of using the inventive rolling compound.

The inventive rolling compound can be applied to any gum matrix adaptable or suitable for dusting. A chewing gum matrix typically comprises a water soluble bulk portion and a water insoluble chewable gum portion, and typically water insoluble flavoring agents. The water soluble portion dissipates with a portion of the flavoring agent over a period of time during the chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber and natural latexes such as chicle. Resins include polyvinylacetate and terpene resins. Fats and oils may also be included in the gum base, including tallow, hydrogenated and partially hydrogenated vegetable oils and cocoa butter. Commonly employed waxes include paraffin, microcrystalline and natural waxes such as beeswax and carnauba. According to the preferred embodiment of the present invention, the insoluble gum base constitutes between about 5 to 95 percent by weight of the gum. More preferably the insoluble gum base comprises between about 10 to 50 percent by weight of the gum and most preferably between about 20 to 30 percent by weight of the gum.

The gum base typically also includes a filler component. Commonly employed filler components include calcium carbonate, talc, dicalcium phosphate and the like.

Gum bases typically also contain softeners, including glycerol monostearate and glycerol triacetate. Further gum bases may also contain optional ingredients such as anti-oxidants, colors and emulsifiers. The present invention contemplates employing any commercially acceptable gum base.

The water soluble portion comprises primarily sweet bulking agents which are powdered sugars or sugar alcohols such as sucrose, glucose, dextrose, fructose, lactose, sorbitol, mannitol, xylitol, and the like.

The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to 15 percent by weight of the chewing gum. Softeners contemplated by the present invention include glycerin, lecithin and combinations thereof. Further, aqueous sweetener solutions such as those containing sorbitol, hydrogenated starch hydrolysates, corn syrup and combinations thereof may be used as softeners and binding agents in gum.

The present invention relates to sugar-containing or sugarless chewing gum formulations. Sugar sweeteners may include saccharide components commonly known in the chewing gum art which comprises but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars. Sugarless sweeteners may comprise sugar alcohols such as sorbitol, mannitol, xylitol, hydrogenated starch hydrolysates, maltitol, and the like, alone or in any combination. The sugar alcohols function not only as sweeteners for sugarless gums, but as bulking agents, i.e. a water-soluble component of the gum base which provides bulk.

A flavoring agent may be present in the chewing gum in an amount within the range of from about 0.25 to 5.0 weight percent of the gum. The flavoring agents may comprise essential oils, synthetic flavors, or mixtures thereof including but not limited to oils derived from plants and fruits such as citrus oils, fruit essences, peppermint oil, spearmint oil, clove oil, oil of wintergreen, anise and the like. Artificial flavoring components are also contemplated. Those skilled in the art will recognize that natural and artificial flavoring agents may be in any sensorially acceptable blend. All such flavors and flavor blends are contemplated by the present invention. It is preferred that the same flavoring is used in both the gum and the inventive rolling compound in order to improve flavor impact and flavor duration.

Optionally, high intensity sweeteners may be present in the chewing gum. These are typically natural or artificial compounds which are at least 20 times sweeter than sucrose including aspartame, acesulfame, cyclamates, saccharin, glycyrrhizin, dihydrochalcones, alitame, sucralose and their food acceptable salts.

Optional ingredients such as colors, emulsifiers and pharmaceutical agents may be added to the chewing gum.

In general, chewing gum is manufactured by sequentially combining the various chewing gum ingredients in any commercially available mixer known in the art. After the ingredients have been thoroughly mixed, the gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifiers may also be added at this time along with syrup and a portion of bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

The rolling compound may be applied before or after the gum mass is extruded into a slab. Preferably, the inventive rolling compound if used alone is applied at a level of about 0.5 to 10 percent by weight of the chewing gum composition. The inventive rolling compound may be mixed from 1:1 to 1:9 with conventional rolling compound. If the inventive rolling compound is mixed with conventional rolling compound, the overall level of the inventive rolling compound can be proportionally reduced.

It is to be understood that changes and modifications to the preferred embodiments described are contemplated by the invention. The following examples are not intended to limit the invention, but are included merely as an illustration of various embodiments.

EXAMPLES

Example 1

Gums A and B were prepared as follows. One batch of gum was prepared according to the following formulation.

| Ingredient | Weight Percent |
|---|---|
| Gum Base | 20.70 |
| Sugar | 54.24 |
| Dextrose Monohydrate | 10.10 |
| Corn Syrup | 13.20 |
| Glycerin | 1.20 |
| Spearmint Flavor | 0.56 |

Two portions of the finished gum batch were taken and treated as follows.

Gum A was prepared as follows: the first portion of the gum batch was sheeted and dusted with a rolling compound containing only powdered sugar. Gum A had an overall flavor level of 0.56%. The overall flavor level is defined as the amount of flavor present in both the chewing gum and the inventive rolling compound measured as a weight percent of the entire chewing gum composition.

Gum B was prepared as follows: Rolling Compound 1 was prepared with a mix consisting of 70% Base 1, 25% sugar and 5% spearmint flavor. Base 1 was prepared according to the following formulation.

| Ingredient | Weight Percent |
|---|---|
| PVAC | 27.3 |
| Filler | 12.4 |
| Fat/Oil | 3.2 |
| Emulsifier/Softener | 6.2 |
| Wax | 12.4 |
| Elastomer | 12.6 |
| Elastomer Solvent | 25.9 |

Rolling Compound 1 was prepared according to the following procedure. The base was pre-softened and mixed with the sugar in a gum mixer for 3 minutes. The flavor was added and mixed another 5 minutes. The mix was removed, pelletized and frozen at 20° F. The mix was ground in a Mikropul grinder using a 0.0109 mesh screen and liquid nitrogen. The mix was blended with Cab-o-sil EH-5, a fumed silica from Cabot Corp., Cab-o-sil Div. Tuscola, Ill. at a ratio of 100:2 mix:Cab-o-sil and reground through a 0.0079 screen. This resulted in a powder that is greater than 98% between 20 and 200 mesh or 75 to 850 microns.

Rolling Compound 1 was then blended with powdered sugar in a ratio of 60:40 sugar:rolling compound to yield Rolling Compound 2. Rolling Compound 2 contains 2% by weight flavor. To obtain Gum B, the second portion of the gum batch was then sheeted and dusted with Rolling Compound 2. The final gum composition comprised about 4% by weight Rolling Compound 2. Thus Gum B had an overall flavor level of 0.64%.

Sensory tests were conducted to compare Gums A and B. Results indicated Gum B had more flavor impact and significantly longer flavor duration.

Example 2

Gum C was prepared exactly as Gum A in Example 1. Gum C which had the powdered sugar rolling compound therefore had an overall flavor level of 0.56%.

Gum D was prepared according to the following formulation.

| Ingredient | Weight Percent |
|---|---|
| Gum Base | 20.70 |
| Sugar | 54.32 |
| Dextrose Monohydrate | 10.10 |
| Corn Syrup | 13.20 |
| Glycerin | 1.20 |
| Spearmint Flavor | 0.48 |

Gum D was dusted with Rolling Compound 2. The final gum composition comprised about 4% by weight Rolling Compound 2. Thus, the overall flavor level of Gum D was 0.56%.

Sensory tests were conducted to compare Gums C and D. Four expert panelists chewed Gums C and D. Results indicated Gum D had slightly more flavor impact and slightly longer flavor duration.

Example 3

Gum E was prepared exactly as Gum A in Example 1.

Gum F was prepared as follows: Rolling Compound 3 was prepared from a mix consisting of 40% Base 1, 55% sugar and 5% spearmint flavor. The procedure described for Rolling Compound 1 was followed to prepare Rolling Compound 3. Rolling Compound 3 was then blended with powdered sugar in a 60:40 ratio of sugar:rolling compound to yield Rolling Compound 4.

A portion of gum with the same composition as Gum D was then sheeted and dusted with Rolling Compound 4. Rolling Compound 4 contained 2% by weight flavor. The final gum composition comprised about 4% by weight Rolling Compound 4. The final product therefore had an overall flavor level of 0.56%. Thus Gums E and F had the same overall flavor level.

Sensory tests by four expert panelists who chewed Gum E and Gum F for 6 minutes indicated that Gum F had better flavor impact, better flavor intensity, overall equivalent flavor character and longer flavor duration than Gum E.

Example 4

Gum G was prepared exactly as Gum A in Example 1.

Gum H was prepared as follows: Rolling Compound 5 was prepared from a mix consisting of 90% Base 1, 5% sugar and 5% spearmint flavor. The procedure described for Rolling Compound 1 was followed to prepare Rolling Compound 5. Rolling Compound 5 was then blended with powdered sugar in a 60:40 ratio of sugar:rolling compound to yield Rolling Compound 6.

A portion of gum with the same composition as Gum D was then sheeted and dusted with Rolling Compound 6. Rolling Compound 6 contained 2% by weight flavor. The final gum composition comprised about 4% by weight Rolling Compound 6. Thus Gums G and H had the same overall flavor level of 0.56%.

Sensory tests by four expert panelists who chewed Gum G and Gum H indicated Gum H had better flavor impact, better flavor intensity, overall equivalent or better flavor character and longer flavor duration than Gum G.

Example 5

Gums J and K were prepared as follows.

| Gum J | |
|---|---|
| Ingredient | Weight Percent |
| Sorbitol | 50.58 |
| Gum Base | 24.00 |
| Mannitol | 8.00 |
| Coevaporated Lycasin/Glycerin Blend | 8.20 |
| Glycerin | 7.30 |
| Aspartame | 0.18 |
| Lecithin | 0.13 |
| 10% Salt solution | 0.08 |
| Color | 0.05 |
| Spearmint flavor | 1.48 |

Gum J was then sheeted and dusted with a rolling compound containing only mannitol. Gum J had an overall flavor level of 1.48%.

| Gum K | |
|---|---|
| Ingredient | Weight Percent |
| Sorbitol | 50.66 |
| Gum Base | 24.00 |
| Mannitol | 8.00 |
| Coevaporated Lycasin/Glycerin Blend | 8.20 |
| Glycerin | 7.30 |
| Aspartame | 0.18 |
| Lecithin | 0.13 |
| 10% Salt solution | 0.08 |
| Color | 0.05 |
| Spearmint flavor | 1.40 |

Rolling Compound 7 was prepared from a mix consisting of 70% Base 2, 25% sorbitol and 5% spearmint flavor. Base 2 was prepared according to the following formulation.

| Ingredient | Weight Percent |
|---|---|
| PVAC | 15.3 |
| Filler | 20.6 |
| Fat/Oil | 13.6 |
| Emulsifier/Softener | 4.7 |
| Wax | 10.0 |
| Elastomer | 16.7 |
| Elastomer Solvent | 19.1 |

The procedure described for Rolling Compound 1 was followed to prepare Rolling Compound 7 except that sorbitol was substituted for the sugar. Rolling Compound 7 was then blended with mannitol at a ratio of 3:2 mannitol:rolling compound to yield Rolling Compound 8.

Gum K was then sheeted and dusted with Rolling Compound 8. The final gum composition comprised about 4% by weight Rolling Compound 8. Gum K therefore had an overall flavor level of 1.48%.

Sensory tests were conducted to compare Gums J and K. Samples of both Gums were chewed by a panel of four experts who indicated Gum K had better flavor impact and longer flavor duration.

We claim:

1. A chewing gum composition having improved flavor impact and extended flavor duration comprising chewable gum base, sweetner and flavoring and having deposited on the surface of said chewing gum a rolling compound comprised of a mixture of 20 to 90 percent by weight gum base, 1 to 15 percent by weight flavoring and 5 to 75 percent by weight sweetner.

2. The chewing gum of claim 1 wherein the rolling compound has a particle size between about 75 and 850 microns.

3. The chewing gum of claim 1 wherein the rolling compound comprises between about 0.5 to 10 percent by weight of the chewing gum composition.

4. The chewing gum of claim 1 wherein the rolling compound comprises between about 0.5 to 5 percent by weight anti-sticking agent.

5. The chewing gum of claim 1 further comprising a bulking agent.

6. The chewing gum of claim 1 further comprising a softener.

7. A chewing gum composition comprising chewable gum base, sweetner, and flavoring, and having deposited on the surface of said chewing gum a rolling compound wherein the rolling compound comprises 20 to 90 percent by weight gum base, 1 to 15 percent by weight flavoring and 5 to 75 percent by weight sweetner and has a particle size between 75 and 850 microns.

8. The chewing gum of claim 7 wherein the rolling compound comprises between about 0.5 to 5 percent by weight anti-sticking agent.

9. The chewing gum of claim 7 further comprising a bulking agent.

10. The chewing gum of claim 7 further comprising a softener.

11. A method of manufacturing a chewing gum composition, having an improved flavor impact and extended flavor duration, the method comprising:
   a) forming a rolling compound mixture comprising about 20 to 90 percent by weight gum base with about 5 to 75 percent by weight sweetener and about 1 to 15 percent by weight flavoring; and
   b) adding the rolling compound mixture to the surface of a preformed gum matrix.

12. The method of claim 11 wherein an anti-sticking agent is employed in the rolling compound mixture and is added in an amount sufficient to obtain a rolling compound mixture having between about 0.5 to 5 percent by weight anti-sticking agent.

13. The method of claim 11 wherein the rolling compound mixture has a particle size between about 75 to 850 microns.

* * * * *

UNITED STATES PATENT AND TRADEMARK OFFICE
CERTIFICATE OF CORRECTION

PATENT NO. : 5,145,696
DATED : September 8, 1992
INVENTOR(S) : MANSUKH M. PATEL

It is certified that error appears in the above-indentified patent and that said Letters Patent is hereby corrected as shown below:

Column 8, line 47,
Claim 11, line 5, please delete "with".

Signed and Sealed this

Fourteenth Day of June, 1994

Attest:

BRUCE LEHMAN

*Attesting Officer*     *Commissioner of Patents and Trademarks*